United States Patent [19]

Proudfit

[11] Patent Number: 5,255,922

[45] Date of Patent: Oct. 26, 1993

[54] GOLF BALL WITH IMPROVED COVER

[75] Inventor: James R. Proudfit, Humboldt, Tenn.

[73] Assignee: Wilson Sporting Goods Co., Chicago, Ill.

[21] Appl. No.: 980,265

[22] Filed: Nov. 23, 1992

Related U.S. Application Data

[63] Continuation-in-part of Ser. No. 733,789, Jul. 26, 1991, abandoned.

[51] Int. Cl.$^5$ ............................................. A63B 37/12
[52] U.S. Cl. .............................. 273/235 R; 525/193;
525/214; 525/236; 525/237; 260/998.14;
524/908; 264/279.1; 264/278; 273/235 A;
273/235 B
[58] Field of Search ................... 273/235 R; 264/278,
264/279.1; 525/193

[56] References Cited

U.S. PATENT DOCUMENTS

| | | | |
|---|---|---|---|
| 3,784,209 | 1/1974 | Berman | 273/218 |
| 4,065,537 | 12/1977 | Miller | 264/143 |
| 4,266,772 | 5/1981 | Martin | 273/218 |
| 4,436,276 | 3/1984 | Donahue | 249/91 |
| 4,483,537 | 11/1984 | Hanada | 273/220 |
| 4,683,257 | 7/1987 | Kakiuchi | 524/432 |
| 4,688,801 | 8/1987 | Reiter | 273/218 |
| 4,714,253 | 12/1987 | Nakahara | 273/228 |
| 4,715,607 | 12/1987 | Llort | 273/218 |
| 4,792,141 | 12/1988 | Llort | 273/235 R |
| 4,931,376 | 6/1990 | Ikematsu | 526/164 |
| 4,984,803 | 1/1991 | Llort | 273/235 R |
| 5,006,297 | 4/1991 | Brown | 264/234 |
| 5,096,201 | 3/1992 | Egashira | |

FOREIGN PATENT DOCUMENTS

| | | |
|---|---|---|
| 31709 | 7/1981 | European Pat. Off. |
| 422826 | 4/1991 | European Pat. Off. |
| 8594434 | 5/1985 | Japan |
| 8809461 | 1/1988 | Japan |
| 2000965 | 4/1988 | Spain |
| 815634 | 7/1959 | United Kingdom |
| 1026254 | 4/1966 | United Kingdom |
| 1345151 | 1/1974 | United Kingdom |
| 2165045 | 3/1986 | United Kingdom |
| 2182340 | 5/1987 | United Kingdom |
| 2203655 | 10/1988 | United Kingdom |
| 2205105 | 11/1988 | United Kingdom |
| 2206889 | 1/1989 | United Kingdom |
| 2230531 | 10/1990 | United Kingdom |
| 2245580 | 1/1992 | United Kingdom |

*Primary Examiner*—Carman J. Seccuro, Jr.

[57] ABSTRACT

A golf ball cover includes a blend of natural or synthetic balata and a crosslinkable elastomer such as polybutadiene. The elastomer is thermally crosslinked with a metallic salt of an unsaturated fatty acid, such as zinc diacrylate, and a crosslinking initiator such as organic peroxide.

16 Claims, 3 Drawing Sheets

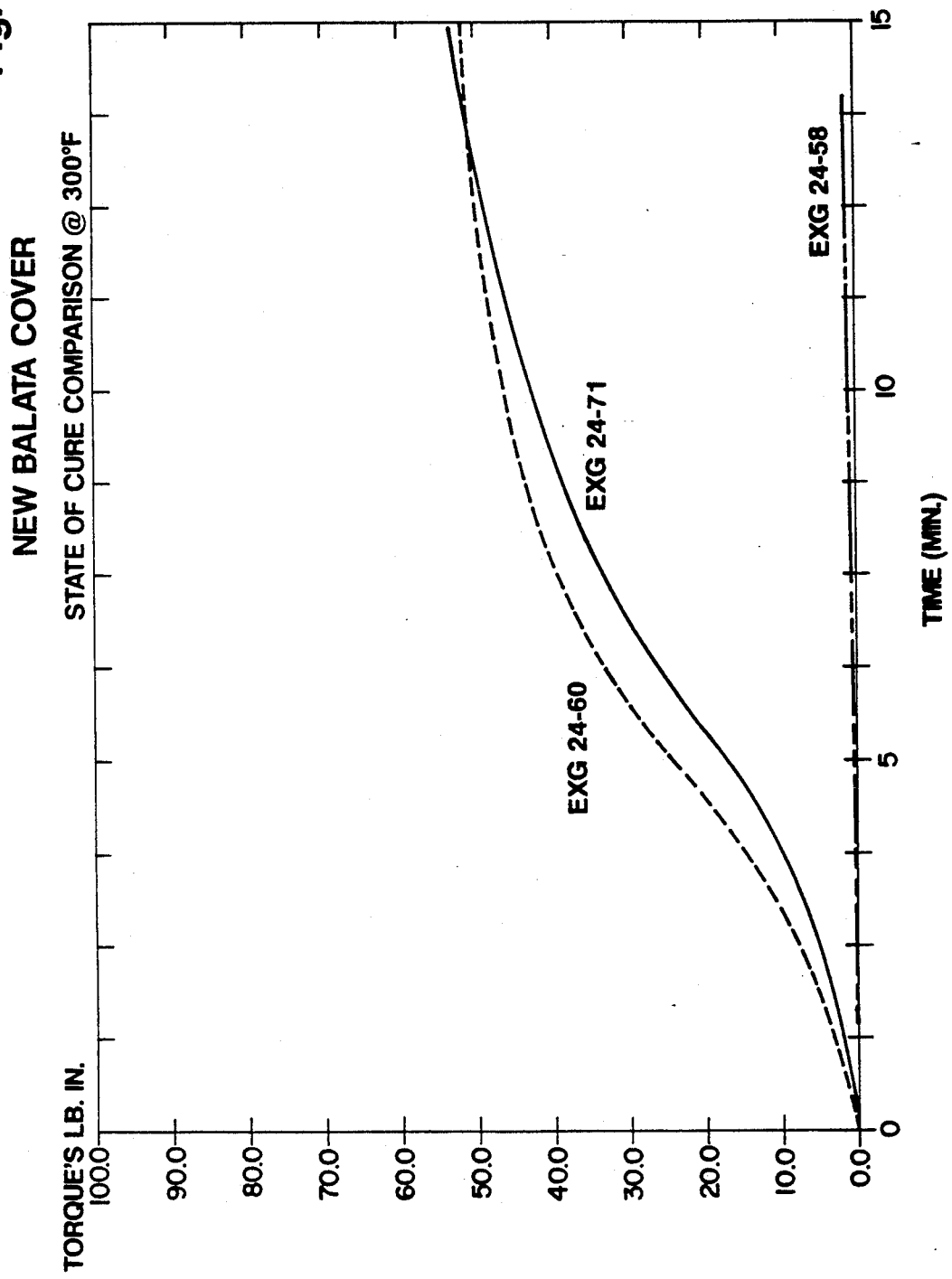

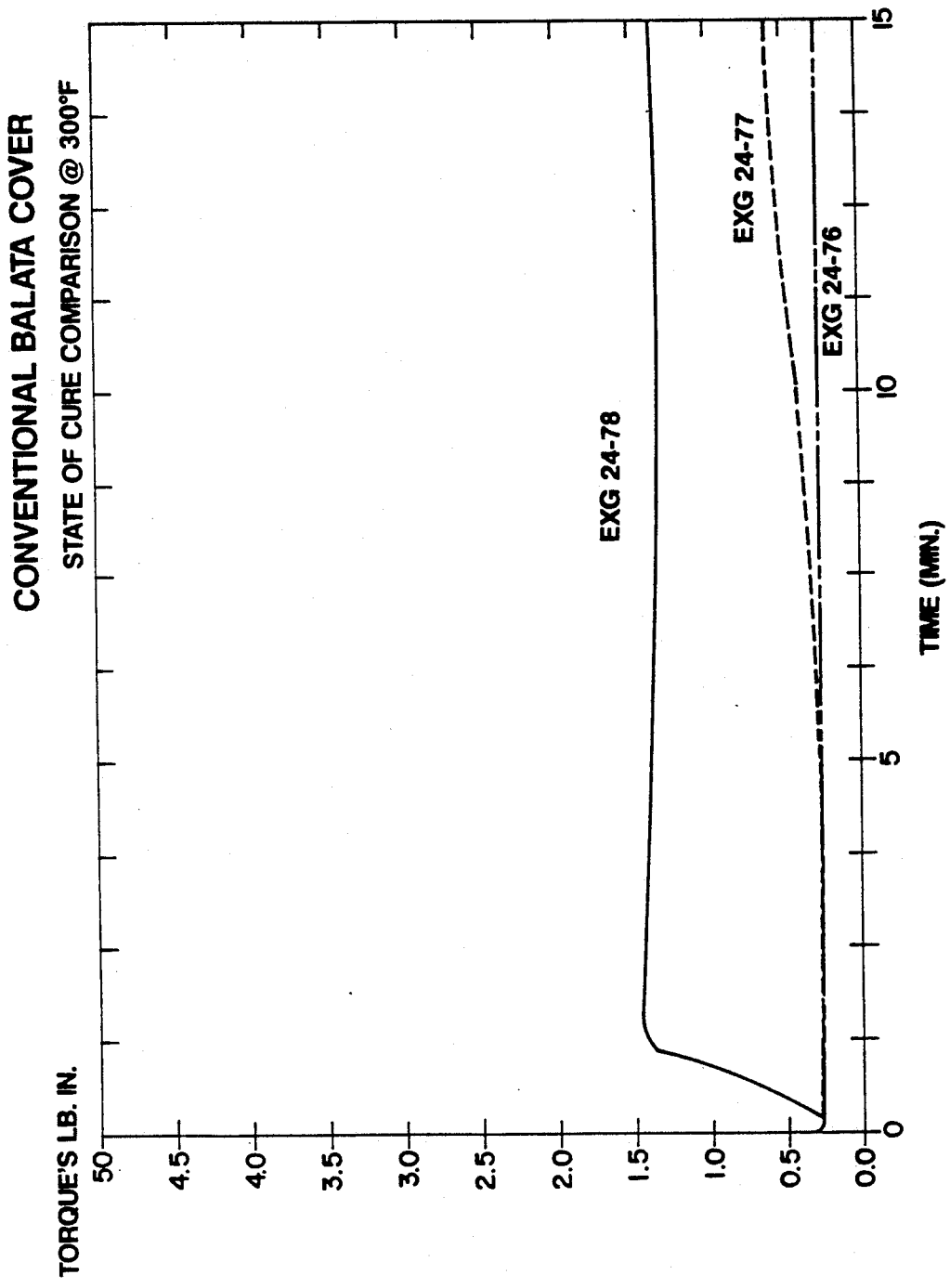

GOLF BALL WITH IMPROVED COVER

RELATED APPLICATION

This application is a continuation-in-part of Ser. No. 733,789, filed Jul. 26, 1991 entitled "Golf Ball with Improved Cover" now abandoned.

BACKGROUND

This invention relates to golf balls, and, more particularly, to a golf ball with an improved cover which includes a blend of balata and a crosslinkable elastomer.

Golf balls which are currently available fall into two general categories—balls which include a balata cover and balls which include a more durable, cut-resistant cover. Balata covers are made from natural balata, synthetic balata, or a blend of natural and synthetic balata. Natural rubber or other elastomers may also be included. Synthetic balata is trans polyisoprene and is commonly sold under the designation TP-301 available from Kuraray Isprene Company Ltd. Most cut-resistant covers utilize Surlyn ionomer, which is an ionic copolymer of methacrylic acid and ethylene available from E. I. du Pont de Nemours & Co.

A number of golfers, primarily professional and low handicap golfers, prefer balata covered balls because of the higher spin rate, control "feel" and "click" which balata provides. "Feel" is the overall sensation imparted to a golfer when the ball is hit, and "click" refers to the sound made when the clubhead hits the ball. However, balata covered balls are more expensive and are less resistant to cutting than Surlyn covered balls.

Conventional balata covered 3 piece golf balls are produced by winding resilient, low heat-resistant elastic thread over a soft rubber or liquid rubber center, which must first be frozen to permit winding the rubber thread, and molding a conventional soft balata cover over the windings. The balata is conventionally vulcanized or crosslinked by using sulfur as the crosslinker or vulcanizing agent.

This process has proven to be very costly and requires numerous extra production steps in manufacture, extended cure time frames in hot room areas, and specified ambient conditions in order to complete the sulfur crosslinking system. The procedures limit the consistency of the crosslinking, reduce the ability to initiate good work-in-process production procedures and maintain normal inventory levels, and limit the time frame after ball finishing for final cover crosslinking which develops the final physical properties of the cover and the ball.

In addition, conventional processing methods for balata covered balls produce relatively low yields of good cosmetic quality balls because the additional processing steps which are required before complete cover crosslinking occurs can damage the cover surface. Also, extra steps are required in conventional balata ball production methods including chlorination and ball rinses to prepare the cover surface for acceptable paint adhesion to the balata surface. Multiple coats of pigmented paint are normally applied prior to logo stamping, then a final clear, two component or ultra violet curable coating is applied to protect the ball surface and logo. While the ball is played, additional paint durability problems may be exhibited in the form of scuffing and micro cracking. Balata golf balls produced using the conventional process methods also suffer from color and color stability problems.

Surlyn covered balls are cheaper than balata balls not only because Surlyn is because than balata but because the Surlyn balls can be processed after molding much easier and faster than balata balls. The substantial processing differences between balata balls and Surlyn balls can be seen by comparing Tables 1 and 2, which describe the conventional processing steps for manufacturing 3 piece balata and 3 piece Surlyn golf balls. The term "3 piece" is commonly used to refer to a golf ball which has a center, a layer of elastic windings over the center, and a cover. The term "2 piece" is used to refer to a golf ball which has a solid core and a cover. Table 3 describes the conventional processing steps for a 2 piece Surly golf ball. The processing steps described in Table 1-3 are well known in the golf ball industry, and a detailed description thereof is unnecessary.

TABLE 1

Conventional 3 Piece Balata Process 1. center rubber compound mixed
2. mill and preform pellets
3. mold center
4. center flash removed
5. freeze center
6. wind core (conventional elastic thread)
7. compression mold heated preform pellets into single halfshells
8. place halfshells over wound core
9. compression mold balata balls Note: cover in only partially crosslinked after this molding step.
10. freeze molded ball prior to buffing
11. remove balls and transfer to fiberglass bags
12. transport frozen balls to holding freezer
13. seam buff ball being careful not to buff seam too deep because of the soft cover
14. grade balls after seam buff for quality level
15. cure balata ball cover in alcohol/RR2 crystals solution, (7 hours soak)
16. remove balls from solution and water rinse
17. transport balls into hot room to cure for 7 days
18. before removing balls from room use benzene test method to insure proper cover cure
19. remove balls from cure room and soak in acetone, (hazard solvent disposal necessary)
20. remove balls from acetone and allow to air dry
21. chlorination process using hydrochloric acid and sodium hypochlorite; load balls into solution tank (must be done in an exhausted area for safety), (chlorination solution must be neutralized before discharge into city sewer drain)
22. remove balls and rinse in clear water tank, up and down motion
23. remove and repeat in second tank
24. remove and repeat in third tank
25. remove and rinse in acetone tank
26. apply primer
27. apply 1st top coat
28. pad print logo
29. apply clear top coat
30. inspect and package

TABLE 2

Conventional 3 Piece Surlyn Process 1. center rubber compound mixed
2. mill and preform slug 3. mold center
4. center flash removed
5. wind center (conventional elastic thread)
6. injection mold halfshells
7. place halfshells over core
8. compression mold ball
9. seam buff parting line
10. vibratory finish ball
11. apply primer
12. pad print logo
13. apply clear top coat
14. inspect and package

TABLE 3

Conventional 2 Piece Surlyn Process 1. center rubber compound mixed
2. mill and preform slug
3. mold core
4. centerless grind core to size
5. injection mold Surlyn cover around core
6. seam buff parting line
7. vibratory finish ball
8. apply primer
10. apply clear top coat
11. inspect and package The balata cover is not fully cured and crosslinked until the 7 day cure step of step No. 17 in Table 1 is completed. As a result, the partially cured balata balls require more careful handling and additional process steps than the Surlyn balls. For example, after the balata balls are removed from the mold they must be frozen before the parting line seam on each ball is buffed. Also, because the balata covers are softer, they must be examined more carefully for defects which could be caused by the processing steps.

DESCRIPTION OF PRIOR ART GOLD BALL CURING SYSTEMS

As stated previously, balata covers are generally vulcanized or cured using sulfur as the vulcanizing agent. Sulfur is included in the cover composition in an amount of about 1 to 2% by weight of the balata. The vulcanizing occurs during the final molding operation in which two hemispherical halfshells of the cover are molded over the thread-wound core in a compression mold. However, the molding temperature and time is limited by the threads, which can be damaged by high heat. Accordingly, the cover is not fully cured when it is removed from the mold and requires the exposure as described in Table 1, step 15 to accelerate the cure through migration of the RR2 crystals accelerator material into the cover crosssectional area to complete the vulcanization of the cover. RR2 crystals are the reaction product of 1,1 methylene dipiperdine and carbon disulfide and are available from Resource Innovations, Inc. of Cartersville, GA. RR2 crystals are dissolved in isopropyl alcohol solvent in the amount of about 10% by weight of crystals to about 90% by weight of alcohol.

By way of example, one specific commercial balata covered ball which was sold by Wilson Sporting Goods Co. had the cover composition described in Table 4.

TABLE 4

| Prior Art Balata Cover Composition (Parts by Weight) | |
| --- | --- |
| Trans Polyisoprene | 84.00 |
| Natural Rubber or Polyisoprene | 16.00 |

TABLE 4-continued

| Prior Art Balata Cover Composition (Parts by Weight) | |
| --- | --- |
| ZnO | 13.00 |
| TiO2 | 17.00 |
| Blue Toner | 0.20 |
| Stearic Acid | 0.26 |
| Thiozole Accelerator | 0.26 |
| Sulfur | 1.20 |
| Total | 131.92 |

This system was not completely crosslinked until steps 15 through 17 were performed in Table 1.

The zinc oxide was used as a filler and a gravity adjuster. The blue toner was used to enhance the white color and was Ultramarine Blue from Whittaker, Clark & Daniels, Inc. of South Plainfield, NJ.

Two piece or solid golf balls conventionally include a core which includes a thermally crosslinkable elastomer such as polybutadiene. The polybutadiene is cured or crosslinked by including in the core composition a crosslinking agent and a crosslinking initiator. Common crosslinking agents are zinc salts of monocarboxylic acids such as zinc diacrylte, zinc acrylate and zinc methacrylate. The crosslinking initiator provides free radicals, and common crosslinking initiators are organic peroxides such as dicumyl peroxide.

U.S. Pat. Nos. 3,784,209, 4,065,537, 4,266,772, 4,483,537, 4,683,257, 4,688,801, 4,714,253, and 4,715,607 describe various solid cores for golf balls which include elastomers such as polybutadiene which are cured or crosslinked by zinc diacrylate and peroxide or similar ingredients.

U.S. Pat. Nos. 4,792,141 and 4,931,376 describe golf ball covers which include blends of balata and elastomers such as polybutadiene and trans polyoctenylene rubber. However, the rubber compositions are cured by the conventional sulfur curing technique.

SUMMARY OF THE INVENTION

The invention provides a golf ball which has many of the desirable features of balata covered balls but is more durable and easier and less expensive to manufacture than conventional balata covered balls.

A golf gall cover in accordance with the invention includes a blend of balata and a thermally crosslinkable elastomer such as polybutadiene. The balata and elastomer are crosslinked during the molding of the ball by a crosslinker such as zinc diacrylate and a crosslinking initiator such as organic peroxide rather than using the conventional sulfur and RR2 crystals curing system for balata covers. The cover is completely crosslinked when the ball is removed from the mold, and subsequently processing steps can be performed in the same manner as on Surlyn covered balls. The cover can be used in either 2 piece or 3 piece balls.

DESCRIPTION OF THE DRAWING

FIGS. 3 and 4 are rheology charts showing curing comparisons of various balata covers.

DESCRIPTION OF SPECIFIC EMBODIMENTS OF THE INVENTIONS

Figure 1:
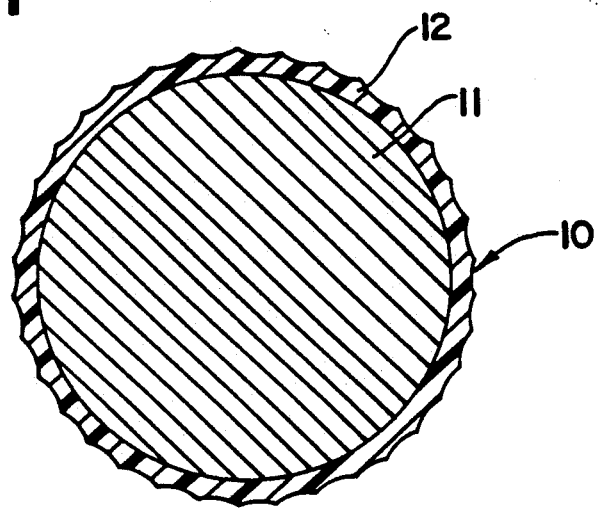
FIG. 1 is a cross section of a two piece ball formed in accordance with the invention.

The cover composition of the invention uses a blend of balata and one or more thermally crosslinkable elastomeric polymers. The balata can be either natural or synthetic balata or a blend of both. The thermally crosslinkable elastomers can be those which have heretofore been used in core compositions of golf balls.

As described in the aforementioned patents, suitable crosslinkable elastomers include homopolymers, copolymers or terpolymers or butadiene, isoprene or chloroprene. Preferably, the elastomer is 1,4 polybutadiene having a cis structure in a proportion of at least 40%. Most preferably the polybutadiene rubber contains at least 90% and even more preferably at least 95% of cis-1,4 bonds. If desired, natural rubbers, polyisoprene rubbers, styrene/butadiene rubbers or the like may be blended with the polybutadiene rubber.

Another suitable elastomer is polyoctenylene rubber having a high trans content. Such a product is available under the trade name Vestanamer from Huls Corp. of West Germany. Particular grades of Vestanamer which are suitable are Vestanamer 8012 and Vestanamer 6213.

The crosslinking agent can be one or more metallic salts of unsaturated fatty acids or monocarboxylic acids, particularly, zinc, calcium or magnesium salts of acrylic acid and methacrylic acid. Zinc diacrylate, zinc acrylate, and zinc methacrylate are particularly suitable.

Any of a number of known crosslinking initiators can be used. These initiators supply free radicals and include various organic peroxides such as dicumyl peroxide and n-butyl-4, 4-bis (t-butylperoxy) valerate on calcium silicate, which is available from R. T. Vanderbilt, Inc. of Norwalk, CT under the trademark Varox 230XL. Suitable crosslinking agents and crosslinking initiators are described in the aforementioned patents which describe polybutadiene cores.

Any suitable filler can be added such as zinc oxide. Zinc oxide not only acts as a filler and as a gravity adjuster buy may also provide crosslinking. Other conventional ingredients may also be includes, such as titanium dioxide and Ultramarine Blue.

The balata is preferably present in an amount ranging from 25% to 99% of the total polymer content of the cover. The balance of the polymer content, namely from 75% to 1% of the total polymer content, is preferably provided by polybutadiene having a high cis-1,4 content, but other suitable crosslinkable elastomers such as natural rubber, Vestanamer, etc. can be blended with the polybutadiene as desired.

The amount of the crosslinking agent generally ranges from 20 to 50 parts by weight of the total polymer content, and is preferably about 35 to 45 parts by weight.

The amount of the crosslinker initiator can range from about ¾ to 3 ½ parts by weight of the total polymer content, and preferably is about 2 to 2 ½ parts by weight.

EXAMPLE 1

A novel cover composition for a two piece ball was prepared using the ingredients (parts by weight) described in Table 5.

TABLE 5

| (Cover Composition) | |
|---|---|
| Trans Polyisoprene | 84.00 |
| Polybutadiene | 16.00 |
| ZnO | 13.00 |
| TiO2 | 17.00 |
| Blue Toner (Ultramarine Blue) | 0.50 |
| Zinc Diacrylate | 35.00 |
| Dicumyl Perixode | 2.50 |
| Total | 168.00 |

One specific core composition used with the new cover is described in Table 6 (parts by weight).

TABLE 6

| (Core Composition) | |
|---|---|
| Polybutadiene | 95.00 |
| Vestenamer 8012 | 5.00 |
| Zinc Diacrylate | 42.00 |
| Zinc Oxide | 5.00 |
| Antioxidant | 0.75 |
| Dicumyl Perixode | 1.50 |
| Total | 149.25 |

The antioxidant was 2,2'-Methylenebis (4-methyl-6-tert-butylphenol) which was obtained from R. T. Vanderbilt Co. of Norwalk, CT under the trade name Vanox MBPC.

The core was processed according to the conventional steps:
1. core rubber compound mixed
2. mill and preform slug
3. mold core
4. centerless grind core to size.

The ground size of the core was 1.575±0.005 inches in diameter. The thickness of the cover was such as to make the diameter of the completed ball 1.680 inches. For a 1.575 inch core, the thickness of the cover was 0.0525 inch. However, it is understood that size of the core and cover can vary depending on the desired cover thickness for a specific end product.

FIG. 1 illustrates the two piece golf ball 10 which includes the core 11 and cover 12.

Figure 2:
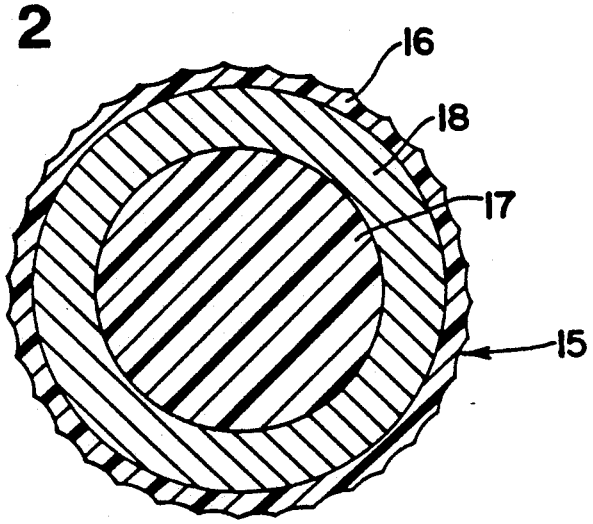
FIG. 2 is a cross section of a three piece ball formed in accordance with the invention.

FIG. 2 illustrates a three piece golf ball 15 with a new cover 16 formed in accordance with the invention. The core is formed by a conventional center 17 and a layer 18 of wound elastic thread. The diameter of the two piece core is conventionally about 1.560 inches and the thickness of the cover is about 0.060 inch.

EXAMPLES 2-10

Cores for two piece balls were made according to the formulas of Table 7.

TABLE 7

| | (Core Compositions) | | |
|---|---|---|---|
| | A<br>EXGI-273 | B<br>EXGI-293 | C<br>EXGI-204 |
| Polybutadiene | 95.00 | 95.00 | 100.00 |
| Vestenamer 8012 | 5.00 | 5.00 | — |
| ZnO | 5.00 | 5.00 | 5.00 |
| ZDA | 42.00 | 42.00 | 42.00 |
| AO 2246 | .75 | .75 | .75 |
| Dicumyl Perixode | 1.50 | 1.50 | 1.50 |
| Total | 149.25 | 149.25 | 149.25 |

A02246 is the same antioxidant which was used in Table 6.

Formulas EXG1-273 and EXGI-293 are identical. The difference is that 1-273 used a masterbatch which included all ingredients except the peroxide. The masterbatch was milled in an internal mixer, and the peroxide was added to the milled masterbatch on an open mill. The 1-293 formula was mixed completely in an internal mixer.

Covers for two piece balls were made according to the formulas of Table 8.

TABLE 8

(Cover Compositions)

|  | EXG24-47 | EXG24-60 | EXG24-70 |
|---|---|---|---|
| Trans Polyisoprene TP-301 | 84.00 | 84.00 | 55.00 |
| Vestenamer 8012 | 16.00 | — | — |
| Polybutadiene | — | 16.00 | 45.00 |
| ZnO | 13.00 | 13.00 | 13.00 |
| ZDA | 35.00 | 35.00 | 35.00 |
| TiO2 | 17.00 | 17.00 | 17.00 |
| Toner (UM Blue) | .50 | .50 | .50 |
| Varox 230XL | 3.00 | 2.50 | 2.50 |
| Total | 168.50 | 168.00 | 168.00 |

Nine groups of balls were made by combining the foregoing cores and covers. The balls were designated as follows:

| Ball | Core | Cover |
|---|---|---|
| A47 | EXG1-273 | EXG24-47 |
| A60 | EXG1-273 | EXG24-60 |
| A70 | EXG1-273 | EXG24-70 |
| B47 | EXG1-293 | EXG24-47 |
| B60 | EXG1-293 | EXG24-60 |
| B70 | EXG1-293 | EXG24-70 |
| C47 | EXG1-294 | EXG24-47 |
| B60 | EXG1-294 | EXG24-60 |
| B70 | EXG1-294 | EXG24-70 |

The dimple pattern which was used on the balls was a 432 dimple pattern illustrated in FIGS. 7 and 8 of U.S. Pat. No. 4,560,168 using spherical dimples. The balls were tested by a mechanical hitting machine using a 9 iron golf club and were compared with commercial balls sold under the trademarks Ultra AR432 (Wilson Sporting Goods,), Tour Edition 100 is a two piece ball with a Surlyn cover. The tour Edition 100 is a two piece ball with a cover which is advertised as Zinthane but which is believed to be a blend of low modulus ionomers similar to Surlyn. The Titleist Tour 100 is a three piece ball with a balata cover, which is believed to be cured by the conventional sulfur curing system.

The results are set forth in Tables 9-11.

TABLE 9

| Ball | Club Speed (Ft/sec) | Ball Speed* (Ft/Sec) | Launch Angle (Degrees) | Spin (RPM) | Spin (Rev/Sec) |
|---|---|---|---|---|---|
| C70 | 95.65 | 138.93 | 19.03 | 8622.29 | 143.70 |
| B47 | 95.63 | 138.59 | 19.28 | 8622.29 | 138.70 |
| A70 | 95.76 | 138.32 | 19.36 | 8411.18 | 140.19 |
| A47 | 95.73 | 138.02 | 19.73 | 8188.95 | 136.48 |
| C60 | 96.06 | 137.86 | 19.67 | 8322.29 | 138.70 |
| A60 | 95.94 | 137.84 | 19.78 | 8144.51 | 135.74 |
| Ultra AR 432 | 95.82 | 137.83 | 23.25 | 5788.94 | 96.48 |
| B70 | 95.93 | 137.82 | 19.37 | 8477.85 | 141.30 |
| B60 | 95.93 | 137.71 | 19.48 | 8477.85 | 141.30 |
| Tour Edition 100 | 95.98 | 137.30 | 20.01 | 8333.40 | 138.89 |
| C47 | 96.08 | 137.23 | 19.79 | 8466.73 | 141.11 |
| Titleist Tour 100 | 95.82 | 137.05 | 20.28 | 7922.29 | 132.04 |

*(Sorted by Adjusted Ball Velocity)

TABLE 10

| Ball | Club Speed (Ft/sec) | Ball Speed (Ft/Sec) | Launch Angle* (Degrees) | Spin (RPM) | Spin (Rev/Sec) |
|---|---|---|---|---|---|
| Ultra AR 432 | 95.82 | 137.83 | 23.25 | 5788.94 | 96.48 |
| Titleist Tour 100 | 95.82 | 137.05 | 20.28 | 7922.29 | 132.04 |
| Tour Edition 100 | 95.98 | 137.30 | 20.01 | 8333.40 | 138.89 |
| C47 | 96.08 | 137.23 | 19.79 | 8466.73 | 141.11 |
| A60 | 95.94 | 137.84 | 19.78 | 8144.51 | 135.74 |
| A47 | 95.79 | 138.02 | 19.73 | 8188.95 | 136.48 |
| C60 | 96.06 | 137.86 | 19.67 | 8322.29 | 138.70 |
| B60 | 95.93 | 137.71 | 19.48 | 8477.85 | 141.30 |
| B70 | 95.93 | 137.82 | 19.37 | 8477.85 | 141.30 |
| A70 | 95.76 | 138.32 | 19.36 | 8411.18 | 140.19 |
| B47 | 95.63 | 139.59 | 19.28 | 8322.29 | 138.70 |
| C70 | 95.63 | 138.93 | 19.03 | 8622.29 | 143.70 |

*(Sorted by Adjusted Launch Angle)

TABLE 11

| Ball | Club Speed (Ft/sec) | Ball Speed (Ft/Sec) | Launch Angle (Degrees) | Spin (RPM) | Spin* (Rev/Sec) |
|---|---|---|---|---|---|
| Ultra | 95.82 | 137.83 | 23.25 | 5788.94 | 96.48 |

TABLE 11-continued

| Ball | Club Speed (Ft/sec) | Ball Speed (Ft/Sec) | Launch Angle (Degrees) | Spin (RPM) | Spin* (Rev/Sec) |
|---|---|---|---|---|---|
| AR 432 Titleist Tour 100 | 95.82 | 137.05 | 20.28 | 7922.29 | 132.04 |
| A60 | 95.94 | 137.84 | 19.78 | 8144.51 | 135.74 |
| A47 | 95.79 | 138.02 | 19.73 | 8188.95 | 136.48 |
| B47 | 95.63 | 139.59 | 19.28 | 8322.29 | 138.70 |
| C60 | 96.06 | 137.86 | 19.67 | 8322.29 | 138.70 |
| Tour Edition 100 | 95.98 | 137.30 | 20.01 | 8333.40 | 138.89 |
| A70 | 95.76 | 138.32 | 19.36 | 8411.18 | 140.19 |
| C47 | 96.08 | 137.23 | 19.79 | 8466.73 | 141.11 |
| B70 | 95.93 | 137.82 | 19.37 | 8477.85 | 141.30 |
| B60 | 95.93 | 137.71 | 19.48 | 8477.85 | 141.30 |
| C70 | 95.63 | 138.93 | 19.03 | 8622.29 | 143.70 |

*(Sorted by Spin Rate)

The Tour Edition 100 ball is promoted as a two piece ball which has some of the feel and characteristics of a balata ball. Tables 7–9 indicate that the novel two piece balls compare favorably with the Tour Edition 100 ball. It is believed that the performance of the novel balls will be improved by optimizing the dimple pattern for the balls.

The same matrix of balls were tested using the same mechanical hitting machine with an Ultra metal driver golf club. The results are set forth in Tables 12–14.

TABLE 12

| Ball | Club Speed (Ft/sec) | Ball Speed* (Ft/Sec) | Launch Angle (Degrees) | Spin (RPM) | Spin (Rev/Sec) |
|---|---|---|---|---|---|
| Ultra AR 432 | 150.18 | 227.72 | 10.20 | 2537.06 | 42.28 |
| Tour Edition 100 | 150.03 | 225.82 | 9.45 | 3537.07 | 58.95 |
| Titleist Tour 100 | 149.94 | 225.61 | 9.41 | 3518.55 | 58.64 |
| B47-S | 150.14 | 224.25 | 9.31 | 3629.66 | 60.49 |
| C47-S | 149.99 | 224.23 | 9.31 | 3685.21 | 61.42 |
| C60-S | 150.06 | 224.09 | 9.25 | 3685.21 | 61.42 |
| A60-S | 150.12 | 223.87 | 9.35 | 3462.99 | 57.72 |
| B60-S | 150.06 | 223.85 | 9.31 | 3666.70 | 61.11 |
| B70-S | 150.04 | 223.78 | 9.25 | 3796.33 | 63.27 |
| A47-S | 149.93 | 223.62 | 9.41 | 3444.47 | 57.41 |
| A70-S | 149.96 | 223.52 | 9.25 | 3648.18 | 60.80 |
| C70-S | 150.01 | 223.45 | 9.21 | 3833.36 | 63.89 |

*(Sorted by Adjusted Ball Velocity)

TABLE 13

| Ball | Club Speed (Ft/sec) | Ball Speed (Ft/Sec) | Launch Angle* (Degrees) | Spin (RPM) | Spin (Rev/Sec) |
|---|---|---|---|---|---|
| Ultra AR 432 | 150.18 | 227.72 | 10.20 | 2537.06 | 42.28 |
| Tour Edition 100 | 150.03 | 225.82 | 9.45 | 3537.07 | 58.95 |
| A47-S | 149.93 | 223.62 | 9.41 | 3444.47 | 57.41 |
| Titleist Tour 100 | 149.94 | 225.61 | 9.41 | 3518.55 | 58.64 |
| A60-S | 150.12 | 223.87 | 9.35 | 3462.99 | 57.72 |
| C47-S | 149.99 | 224.23 | 9.31 | 3685.21 | 61.42 |
| B47-S | 150.14 | 224.25 | 9.31 | 3629.66 | 60.49 |
| B60-S | 150.06 | 223.85 | 9.31 | 3666.70 | 61.11 |
| C60-S | 150.06 | 224.09 | 9.25 | 3685.21 | 61.42 |
| B70-S | 150.04 | 223.78 | 9.25 | 3796.33 | 63.27 |
| A70-S | 149.96 | 223.52 | 9.25 | 3648.18 | 60.80 |
| C70-S | 150.01 | 223.45 | 9.21 | 3833.36 | 63.89 |

*(Sorted by Adjusted Launch Angle)

TABLE 14

| Ball | Club Speed (Ft/sec) | Ball Speed (Ft/Sec) | Launch Angle (Degrees) | Spin* (RPM) | Spin* (Rev/Sec) |
|---|---|---|---|---|---|
| Ultra AR 432 | 150.18 | 227.72 | 10.20 | 2537.06 | 42.28 |
| A47-S | 149.93 | 223.62 | 9.41 | 3444.47 | 57.41 |
| A60-S | 150.12 | 223.87 | 9.35 | 3462.99 | 57.72 |

TABLE 14-continued

| Ball | Club Speed (Ft/sec) | Ball Speed (Ft/Sec) | Launch Angle (Degrees) | Spin* (RPM) | Spin* (Rev/Sec) |
|---|---|---|---|---|---|
| Titleist Tour 100 | 149.94 | 225.61 | 9.41 | 3518.55 | 58.64 |
| Tour Edition 100 | 150.03 | 225.82 | 9.45 | 3537.07 | 58.95 |
| B47-S | 150.14 | 224.25 | 9.31 | 3629.66 | 60.49 |
| A70-S | 149.96 | 223.52 | 9.25 | 3648.18 | 60.80 |
| B60-S | 150.06 | 223.85 | 9.31 | 3666.70 | 61.11 |
| C47-S | 149.99 | 224.23 | 9.31 | 3685.21 | 61.42 |
| C60-S | 150.06 | 224.09 | 9.25 | 3685.21 | 61.42 |
| B70-S | 150.04 | 223.78 | 9.25 | 3796.33 | 63.27 |
| C70-S | 150.01 | 223.45 | 9.21 | 3833.36 | 63.89 |

*(Sorted by Spin Rate)

The balls were also flight tested on the hitting machine with a metal driver sold by Wilson Sporting Goods under the trademark Ultra. The speed of the club at impact was 150 feet per second. The initial velocity was measured in accordance with the specification of the U.S. Golf Association and the carry and total distance were measured. The results are set forth in Table 15.

TABLE 15

| Ball | USGA Initial Velocity (feet per second) | Carry (yards) | Total (yards) |
|---|---|---|---|
| A47 | 250.5 | 254.1 | 269.7 |
| A60 | 250.9 | 254.0 | 271.1 |
| A70 | 251.1 | 253.6 | 270.5 |
| B47 | 251.1 | 254.2 | 272.1 |
| B60 | 251.1 | 253.6 | 271.0 |
| B70 | 250.9 | 253.7 | 271.0 |
| C47 | 251.8 | 253.3 | 270.0 |
| C60 | 251.0 | 253.8 | 268.8 |
| C70 | 251.3 | 252.8 | 269.0 |
| AR 432 | 254.5 | 259.1 | 280.0 |
| Titleist Tour 100 Balata | 253.2 | 254.8 | 270.7 |
| Tour Edition | 251.7 | 253.8 | 270.1 |

Additional tests were performed on selected balls using a driver at speeds of 150 and 130 feet per second and a 5 iron at a speed of 115 feet per second as set forth in Table 16.

TABLE 16

| Ball | Driver 150 fps Carry | Driver 150 fps Total | Driver 130 fps Carry | Driver 130 fps Total | 5 Iron 115 fps Carry | 5 Iron 115 fps Total |
|---|---|---|---|---|---|---|
| B47 | 246.6 | 260.0 | 210.1 | 225.5 | 162.2 | 181.3 |
| B60 | 246.9 | 261.3 | 210.3 | 227.2 | 162.0 | 181.2 |
| B70 | 245.3 | 258.5 | 209.0 | 224.7 | 162.0 | 181.6 |
| Tour Edition | 246.5 | 260.0 | 212.5 | 227.0 | 162.3 | 182.8 |

The coefficient of restitution (COR) of the balls were measured as set forth in Table 17. Coefficient of restitution is measured by firing the ball against a metal plate and determining the ratio of the rebound speed with the inbound speed. Inbound speeds of 120 and 145 feet per second were used.

TABLE 17

| Ball | COR 120 fps | COR 145 fps |
|---|---|---|
| A47 | 0.8072 | 0.7904 |
| A60 | 0.8199 | 0.7864 |
| A70 | 0.8060 | 0.7966 |

TABLE 17-continued

| Ball | COR 120 fps | COR 145 fps |
|---|---|---|
| B47 | 0.8168 | 0.7966 |
| B60 | 0.8021 | 0.7816 |
| B70 | 0.8009 | 0.7898 |
| C47 | 0.8137 | 0.7941 |
| C60 | 0.8084 | 0.7856 |
| C70 | 0.8256 | 0.7985 |
| AR 432 | 0.8463 | 0.805 |
| Titleist Tour 100 Balata | 0.8275 | 0.7983 |
| Tour Edition | 0.8096 | 0.7888 |

Tables 18 and 19 set forth additional formulas for the core and the cover of a two piece ball. It is believed that the core compositions of Table 18 will have increased COR and that the cover compositions of Table 19 will have increased initial velocity.

TABLE 18

| | Core Compositions | | |
|---|---|---|---|
| | D EXG1-298 | E EXGI-299 | F EXG1-300 |
| Polybutadiene | 95.00 | 95.00 | 95.00 |
| Vestenamer 8012 | 5.00 | 5.00 | 5.00 |
| ZnO | 3.80 | 4.90 | 3.75 |
| ZDA | 45.00 | 42.00 | 45.00 |
| AO 2246 | .75 | .25 | .25 |
| Dicumyl Perixode | 1.50 | .75 | .75 |
| Total | 153.35 | 149.10 | 150.87 |

TABLE 19

| | Cover Compositions | | |
|---|---|---|---|
| | EXG24-72 | EXG24-73 | EXG24-74 |
| Trans Polyisoprene (TP-301) | 84.00 | 84.00 | 84.00 |
| Polybutadiene | 16.00 | 16.00 | 16.00 |
| ZnO | 13.00 | 5.00 | 5.00 |
| ZDA | 35.00 | 35.00 | 35.00 |
| TiO2 | 17.00 | 17.00 | 17.00 |
| Toner (UM Blue) | .50 | .50 | .50 |
| Dicumyl peroxide | 1.50 | 1.50 | — |
| Varox 230 XL | — | — | 2.50 |
| Total | 167.00 | 159.00 | 160.00 |

The golf ball covers of the examples are made by conventional mixing and molding procedures. The components of the composition are mixed on a mill such as two roll mill to form slabs. Slabs are fed into a dicer which cubes the cover compound prior to the injection molding to form generally hemispherical halfshells. The halfshells are placed about the core of the ball in a compression molding machine which fuses the halfshells to each other and to the core. The compression molding operation is carried out under a temperature of about 250° to 350° F. for about 5 to 10 minutes. The molding temperature causes the elastomer to crosslink, and it is believed that the ball if fully crosslinked when it is removed from the compression mold.

The cover composition can also be used in a conventional injection molding machine to form an injection molded cover about a solid core.

The rheology chart of FIG. 3 shows that the crosslinking agent causes crosslinking of not only the polybutadiene but also of the balata and that the composition is fully crosslinked after the molding operation. The rheology chart was prepared by tests conducted on a Monsanto Moving Die Rheometer MDR 2000 available from Monsanto Instruments & Equipment of Akron, OH. The rheometer is used to measure cure characteristics of rubber and measures the reaction torque as a function of cure time or degree of vulcanization. Curing was performed at 300° F.

FIG. 3 compares the following cover formulas:
EXG24-60: from Table 8
EXG24-71: same as EXG24-60 but without polybutadiene
EXG24-58: same as EXG24-60 but without polybutadiene and peroxide EXG24-58 without peroxide exhibits very poor curing characteristics. The other two formulas have comparable curves which indicate that the composition which includes balata and polybutadiene is just as crosslinkable as the composition which contains only balata and no polybutadiene.

FIG. 4 is a rheology chart which compares the three balata cover compositions set forth in Table 20.

TABLE 20

| (Cover Compositions) | | | |
|---|---|---|---|
| | EXG24-78 | EXG24-77 | EXG24-76 |
| Trans Polyisoprene | 84.00 | 84.00 | 84.00 |
| Natural Rubber | 16.00 | 16.00 | 16.00 |
| ZnO | 13.00 | 13.00 | 13.00 |
| TiO2 | 17.00 | 17.00 | 17.00 |
| UM Blue | .20 | .20 | .20 |
| Stearic Acid | .26 | .26 | .26 |
| Thiozale Accelerator | .26 | .26 | .26 |
| Sulfur | 1.20 | 1.20 | — |
| RR-2 Crystals | 1.50 | — | — |
| Total | 133.42 | 131.92 | 130.72 |

Formula EXG24-78 is comparable to a conventional prior art balata cover which is cured by sulfur and the step of soaking the completed ball in an alcohol/RR2 crystal solution described in Step No. 15 of Table 1. However, in order to test the composition of the MDR 2000 Rheometer the RR2 crystals were incorporated into the composition to simulate the subsequent soaking step.

Formula EXG24-77 is the same as formula EXG24-78 but omits the RR2 crystals. Formula EXG24-76 is the same as formula EXG24-78 but omits both sulfur and the RR2 crystals.

It is significant to note the difference between the cure rheology of the balata compositions illustrated in FIG. 4 and the new balata compositions cured by zinc diacrylate and peroxide illustrated in FIG. 3. The rheology physical properties for the compositions in FIG. 4 are so low compared to the compositions of FIG. 3 that the scale of FIG. 4 had to be changed from 0 to 100 torque units to 0 to 5 torque units in order to be meaningful. The cover composition of formula EXG24-60 of FIG. 3 has significantly higher torque than formula EXG24-78 of FIG. 4. Also, the rheology cure curve for formula EXG24-78 shows reversion, while the cure curve of formula EXG24-60 shows essentially a curve which is flatlined.

Because the covers of molded golf balls formed in accordance with the invention are fully crosslinked after the molding operation, the golf balls can be processed in a manner in which is very similar to the processing of surlyn covered balls, thereby greatly facilitating the additional processing steps and reducing the overall cost of the balls. The processing steps for 3 piece and 2 piece balls formed in accordance with the invention are described in Table 21 and 22, and these processing steps can be compared with the steps described in Tables 1-3.

TABLE 21

New 3 Piece Balata Process 1. center rubber compound mixed
2. mill and preform slug
3. mold center
4. center flash removed
5. wind center with heat resistant thread
6. injection mold halfshell covers
7. place halfshells over core
8. compression mold ball
9. seam buff parting line
10. vibratory finish ball
11. apply primer
12. logo print
13. apply clear top coat
14. inspect and package

TABLE 22

New 2 Piece Balata Process 1. core rubber compound mixed
2. mill and preform slug
3. mold core
4. centerless grind core to size
5. injection mold halfshell covers
6. place halfshells over core
7. compression mold ball
8. sam buff parting line
9. vibratory finish ball
10. apply primer
11. logo print
12. apply clear coat
13. audit inspect and package Note: The cover can also be injection molded over the core using conventional injection molding technology.

Steps 5 and 10 through 25 in Table 1 have been eliminated using the new technology described in Tables 21 and 2. The 30 steps used to process balata covers in the old procedure have been replaced by 14 steps for 3 piece balls and 13 steps for 2 piece balls.

Cut-resistance tests have not yet been performed on balls with the new covers. However, it is believed that the cut resistance of the new covers will be significantly better than the cut resistance of conventional balata balls, thereby substantially increasing the durability of the covers.

While in the foregoing specification a detailed description of specific embodiments of the invention were set forth for the purpose of illustration, it will be understood that many of the details herein given may be varied considerably by those skilled in the art without departing from the spirit and scope of the invention.

I claim:

1. A golf ball comprising a core and a cover wherein the cover having a different composition than the core is formed from a composition comprising:
   (a) natural or synthetic balata;
   (b) an elastomer which is crosslinkable with a metallic salt of an unsaturated fatty acid, said elastomer selected from the group consisting of polyoctenylene; homopolymers, copolymers or terpolymers of butadiene and homopolymers, copolymers, or terpolymers of chloroprene;
   (c) a metallic salt of an unsaturated fatty acid as a crosslinking agent; and
   (d) a crosslinking initiator which provides a source of free radicals.

2. The golf balls of claim 1 in which the elastomer is selected from the group consisting of polybutadiene and polyoctenylene.

3. The golf ball of claim 1 in which the natural or synthetic balata is present in an amount ranging from 25 to 99% of the total weight of polymer and the crosslinkable elastomer is present in an amount ranging from 1 to 75% of the total weight of polymer.

4. The golf ball of claim in which the crosslinking agent is selected from the group of metallic salts consisting of calcium and magnesium.

5. The golf ball of claim 1 in which the crosslinking agent is selected from the group consisting of zinc, calcium, and magnesium salts of monocarboxylic acids.

6. The golf ball of claim 1 in which the crosslinking initiator is organic peroxide.

7. The golf ball of claim 1 in which the core is a solid core.

8. The golf ball of claim 1 in which the core is a 2 piece core comprising a center and a layer of elastic windings over the center.

9. The golf ball of claim 1 in which the crosslinkable elastomer is polybutadiene.

10. The golf ball of claim 9 in which the polybutadiene is cis 1,4 polybutadiene having a cis content of at least 40%.

11. A golf ball comprising a core and a cover wherein the cover having a different composition than the core is formed from a composition comprising:
   (a) from 25 to 99 parts by weight of natural or synthetic balata;
   (b) from 1 to 75 parts by weight of an elastomer which is crosslinkable with a metallic salt of an unsaturated fatty acid, said elastomer selected from the group consisting of polyoctenylene; homopolymers, copolymers or terpolymers of butadiene and homopolymers, copolymers, or terpolymers of chloroprene;
   (c) from 20 to 50 parts by weight of a metallic salt of an unsaturated fatty acid as a crosslinking agent; and
   (d) from ¾ to 3 ½ parts by weight of a crosslinking initiator which provides a source of free radicals.

12. The golf ball of claim 11 in which the crosslinkable elastomer is polybutadiene.

13. The golf ball of claim 12 in which the polybutadiene is cis 1,4 polybutadiene having a cis content of at least 40%.

14. In a method of making a golf ball comprising a core and cover wherein the cover having a different composition than the core is formed from an admixture of natural or synthetic balata and a crosslinkable elastomer, said elastomer selected from the group consisting of polyoctenylene; homopolymers, copolymers or terpolymers of butadiene and homopolymers, copolymers, or terpolymers of chloroprene; the improvement of the cover comprising the inclusion of a metallic salt of an unsaturated fatty acid as a crosslinking agent and a source of free radicals as a crosslinking initiator.

15. A method of making a golf ball comprising the steps of:
   (a) forming an admixture of natural or synthetic balata, a crosslinkable elastomer, a metallic salt of an unsaturated fatty acid as a crosslinking agent, and a crosslinking initiator which provides a source of free radicals;
   (b) milling the admixture to form a blended composition; and
   (c) molding the blended composition about a half ball core having a different composition than the cover to crosslink the crosslinkable elastomer, said elastomer selected from the group consisting of polyoctenylene; homopolymers, copolymers or terpolymer of butadiene and homopolymers, copolymers, or terpolymers of chloroprene.

16. The method of claim 15 in which the molding is performed under a temperature of about 250° to 350 F. for about 5 to 10 minutes.

* * * * *

UNITED STATES PATENT AND TRADEMARK OFFICE
CERTIFICATE OF CORRECTION

PATENT NO. : 5,255,922

DATED : October 26, 1993

INVENTOR(S) : James R. Proudfit

It is certified that error appears in the above-identified patent and that said Letters Patent is hereby corrected as shown below:

Col. 15, line 26 insert --1-- after "claim".
    Col. 16, line 38 change "half" to --golf--.

Signed and Sealed this

Fifth Day of April, 1994

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,255,922
DATED : OCTOBER 26, 1993
INVENTOR(S) : James R. Proudfit

It is certified that error appears in the above-indentified patent and that said Letters Patent is hereby corrected as shown below:

Col. 1, line 22 change "Isprene" to --Isoprene--.
Col. 2, line 4 change the second occurrence of "because" to --cheaper-- and in line 16 change "Surly" to --Surlyn--.
Col. 5, line 12 change the second occurrence of "or" to --of--.

Signed and Sealed this

Fourteenth Day of June, 1994

Attest:

BRUCE LEHMAN

Attesting Officer

Commissioner of Patents and Trademarks